United States Patent [19]

Seidel

[11] 4,024,452
[45] May 17, 1977

[54] INTEGRATED SOLID STATE ISOLATOR CIRCUIT

[75] Inventor: Harold Seidel, Warren, N.J.

[73] Assignee: Bell Telephone Laboratories, Incorporated, Murray Hill, N.J.

[22] Filed: Mar. 10, 1976

[21] Appl. No.: 665,420

[52] U.S. Cl. .............................. 321/2; 331/108 B
[51] Int. Cl.² ........................................ H02M 3/28
[58] Field of Search ................... 321/2, 46; 330/10; 324/118; 331/108 B

[56] References Cited

UNITED STATES PATENTS

| | | | |
|---|---|---|---|
| 3,209,272 | 9/1965 | Mendel | 330/10 |
| 3,392,338 | 7/1968 | Uenohara | 330/10 |
| 3,593,042 | 7/1971 | Cook | 331/108 B |
| 3,708,741 | 1/1973 | Hekimian | 321/2 |
| 3,913,001 | 10/1975 | Kayama | 330/10 |

OTHER PUBLICATIONS

Handbook of Electronic Control Circuits, John Markus, 1959, p. 215.

*Primary Examiner*—William H. Beha, Jr.
*Attorney, Agent, or Firm*—Robert O. Nimtz

[57] ABSTRACT

Disclosed is a ground isolating circuit adapted for construction on a single integrated circuit surface. The circuit comprises a microwave oscillator responsive to an applied data signal, a planar transformer for coupling the microwave signals generated by the oscillator, and a detector for rectifying the coupled, ground isolated microwave signal.

5 Claims, 3 Drawing Figures

INTEGRATED SOLID STATE ISOLATOR CIRCUIT

BACKGROUND OF THE INVENTION

This relates to electronic circuits for providing direct current (dc) isolation.

In the field of electronic signaling, a need occasionally arises for establishing a dc discontinuity between two selected points along a signaling path. This is generally accomplished with capacitors, transformers, relays, or optical isolators. Optical isolators are particularly useful in signal processing applications, such as intercomputer communication paths, because they are small and because their speed of response is high.

One drawback of optical isolators, however, is their relatively low efficiency which results from loss in conversion from electricity to light, loss in dispersal of light, and loss in conversion from light to electricity.

In a separate field of art, dc-to-dc converters are employed to convert a dc voltage of one magnitude to a dc voltage of another magnitude. Such a converter generally includes a high efficiency oscillator for converting the dc input voltage to an ac voltage, a transformer for stepping-up (or stepping-down) the ac voltage, and a rectifier responsive to the stepped-up (or stepped-down) ac voltage. In order to obtain a reasonable efficiency, the transformers used in such dc-to-dc converters are generally large and have a core of a relatively high permeability as compared to a core of a relatively high permeability as compared to that of air. Also for sake of efficiency, such dc-to-dc converters generally employ switching oscillators rather than sinusoidal oscillators, and operate them at frequencies below 100 kHz. It should be noted, however, that T. Fujii et al, Electronics, p. 163, Nov. 1, 1957, describes a dc-to-dc converter which employs sinusoidal oscillations in the radio frequency range, and which also employs an air core step-up transformer.

It is an object of this invention to provide a small, inexpensive, efficient, high speed dc (ground) isolating circuit.

SUMMARY OF THE INVENTION

This object is achieved with an isolator circuit employing dc-to-dc conversion techniques in conjunction with operating parameters and physical construction which are particularly well-suited for integration. Specifically, the isolator circuit of this inventon comprises an integrated circuit sinusoidal oscillator adapted to oscillate at microwave frequencies in response to an applied input signal having a dc component, e.g., logic pulses. The output signal of the microwave oscillator is applied to a transformer constructed on the integrated circuit chip upon which the oscillator is constructed. A detector, similarly constructed on the integrated circuit chip upon which the oscillator is constructed, is connected to rectify the output signal of the transformer developing thereby a dc isolated replica signal of the applied input signal.

DETAILED DESCRIPTION

Figure 1:
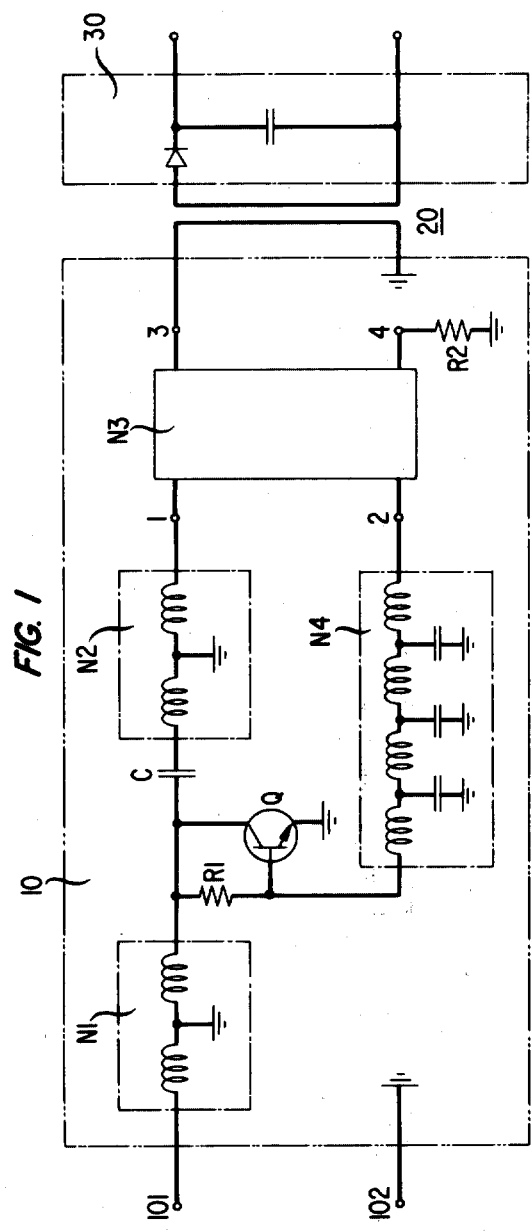
FIG. 1 depicts a general block diagram of the isolator circuit of this invention.

Element 10 of FIG. 1 is a microwave oscillator responsive to an input signal applied between terminals 101 and 102. The applied input signal may be dc in nature or a pulsed (logic) signal having a dc component. Within element 10, a network N1 serves to apply the input signal to the collector terminal of a transistor Q while preventing the ac signal of the collector of transistor Q from reaching terminal 101. Network N1 may be a conventional low-pass filter network, such as a capacitor-inductor T network as shown in the illustrative embodiment of FIG. 1. The applied input signal of terminal 101 is also applied, via network N1, to the base of transistor Q through resistor $R_1$. The value of resistor $R_1$ determines the bias current of transistor Q.

To produce oscillations, the ac output signal on the collector terminal of transistor Q must be fed back in proper phase to the base of transistor Q. This is accomplished through a series connection of a bypass capacitor C, an impedance-matching network N2, a signal coupling network N3 and a phase-shifting impedance-matching network N4. Networks N2 and N3 may comprise conventional ladder T networks as illustrated in FIG. 1 and network 3 may be a coupling network constructed in accordance with the teachings of my U.S. Pat. No. 3,514,722 issued May 2, 1970. Specifically, network N3 may employ the structure depicted in FIG. 2 of my said patent, with terminals 1, 2, 3 and 4 of network N3 corresponding to terminals 1, 2, 3 and 4, respectively of said FIG. 2. In accordance with the teachings of that patent, in response to a signal applied to terminal 1, a transmitted output signal is produced at terminal 3, a coupled output signal is produced at terminal 2 in phase quadrature with the signal at terminal 3, and no output signal is produced at terminal 4. For proper operation of network N3, terminal 4 is terminated with a resistor $R_2$ having an appropriate impedance value.

The output signal of network N3 (terminal 3) comprises the output signal of microwave oscillator 10. That output signal, referenced to the ground potential of terminal 102, is connected to a primary winding of a planar transformer 20. As in a conventional transformer, the secondary winding of planar transformer 20 is isolated from the dc (i.e., ground) potential of the primary winding. This provides for the desired ground isolation of the integrated circuit isolator of this invention. The output signal of the secondary winding of transformer 20 is applied to a microwave detector 30 which rectifies and averages the output signal of the secondary winding of transformer 20, thereby developing a replica of the signal applied at terminal 101. Detector 30 may be any conventional microwave detector, such as the conventional diode-capacitor network depicted in FIG. 1.

One of the more important aspects of this invention is the use of circuit elements which can be integrated; and in particular, the use of a dc isolating element which can be integrated. Such an isolating element may be a network of capacitors, or a transformer. Whichever is used, however, care must be exercised to provide for efficient energy transfer through the isolating element. To help achieve such an energy transfer capability, the unusual use of microwave oscillating frequencies of grate benefit since it permits the employment of low valued capacitors, inductors and transformers.

Figure 3:
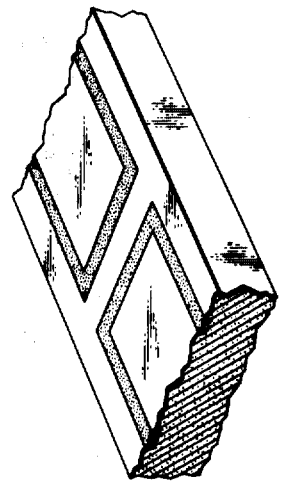
FIG. 3 illustrates an acceptable structure for transformers employed in FIG. 1.
Figure 2:
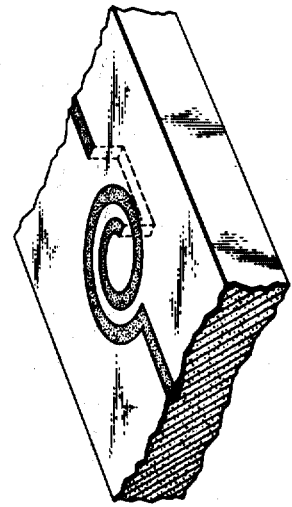
FIG. 2 illustrates an acceptable structure for the inductors employed in the circuit of FIG. 1.

The construction of the valued integrated circuit capacitors has been described by Dorendorf, U.S. Pat. No. 3,400,310, issued Sept. 3, 1968, and by Chen, U.S. Pat. No. 3,619,735, issued Nov. 9, 1971. Similarly, the construction of low valued inductors has been described, for example, by Shield, U.S. Pat. No. 3,614,554, issued Oct. 19, 1971. The Shield patent describes an inductor construction which is somewhat similar to the conventional three dimensional construction of an inductor. Alternatively, an inductor may be constructed, as shown in FIG. 2, by spiraling a conducting path on the semiconductor material and by accessing the center of the spiral by the use of multi-layered construction. Multilayered construction is well known in the art of integrated circuit manufacturing. Transformer 20 may be integrated by manufacturing two parallel line segment conductors upon the integrated circuit semiconductor chip. Such a construction is depicted in FIG. 3, with the electromagnetic coupling of the transformer being conveniently controlled by selecting the length of the conductor line segments and the separation therebetween.

What is claimed is:

1. An integrated circuit for developing an output signal in response to, but isolated from, an input signal comprising:

an oscillator activated by said input signal for generating microwave signals;

a planar transformer having a primary and a secondary winding, with said primary winding being responsive to said microwave signals; and means connected to said secondary winding for rectifying the signal of said secondary winding to develop said output signal.

2. The circuit of claim 1 wherein said primary winding of said planar transformer comprises a first fixed length planar conductor and wherein said secondary winding of said planar transformer comprises a second fixed length planar conductor situated in proximity and parallel to said first length planar conductor.

3. The circuit of claim 1 wherein said oscillator, said planar transformer and said means for rectifying are constructed on a signal semiconductor surface.

4. A method for providing ground isolation between a first circuit supplying a data signal and a second circuit receiving a replica signal of said data signal comprising the steps of:

applying said data signal to an oscillator so as to cause said oscillator to develop a microwave frequency signal;

applying said microwave frequency signal to a primary winding of a planar transformer for coupling said microwave frequency signal to a secondary winding of said transformer; and rectifying the output signal of said secondary transformer for developing said replica signal of said data signal.

5. A method for providing ground isolation between a first circuit supplying a data signal and a second circuit receiving a replica signal of said data signal comprising the steps of:

developing a microwave frequency signal in response to said data signal;

applying said developed microwave frequency signal to an integrated circuit planar transformer to provide a ground isolated replica signal of said developed microwave frequency signal; and rectifying said ground isolated replica signal, developing thereby said replica signal of said data signal.

* * * * *